Aug. 6, 1946.  C. P. DISNEY  2,405,295
METHOD OF CONSTRUCTING PIERS
Original Filed Oct. 20, 1944  5 Sheets-Sheet 1
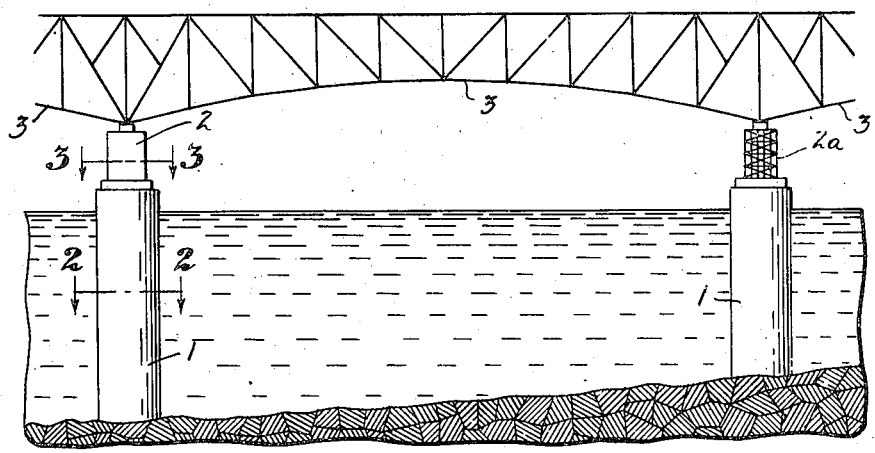
Fig. 1
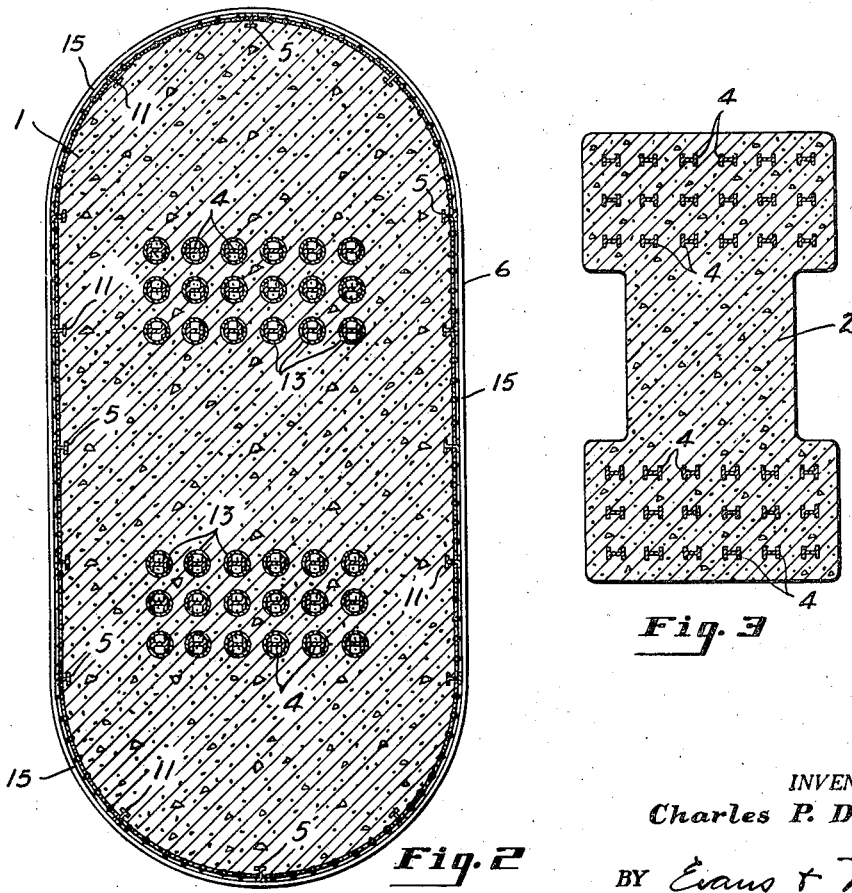
Fig. 2
Fig. 3
INVENTOR.
Charles P. Disney
BY Evans & McCoy
ATTORNEYS INVENTOR.
Charles P. Disney
BY Evans + McCoy
ATTORNEYS

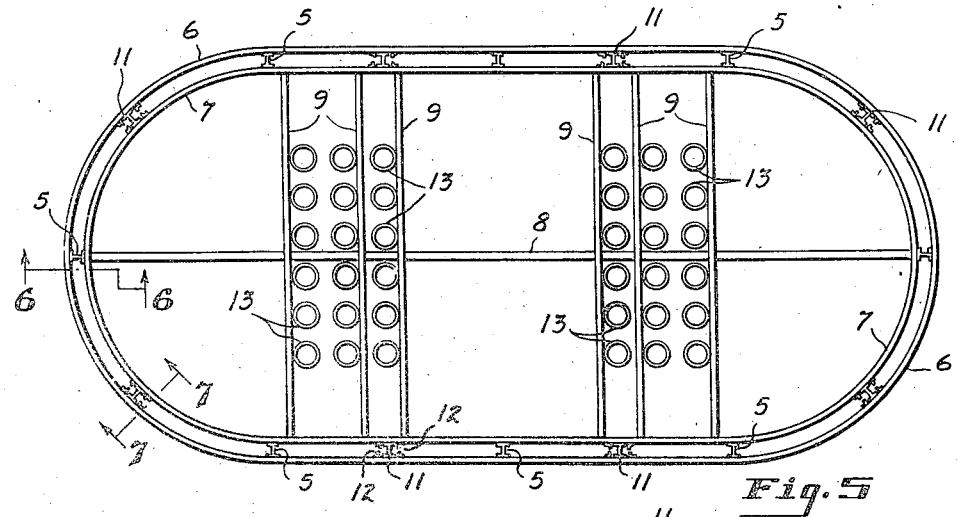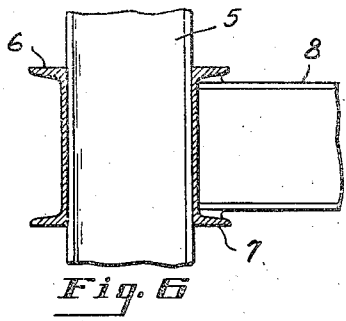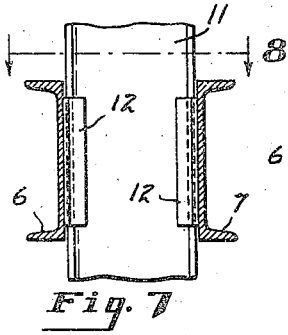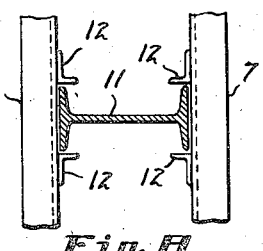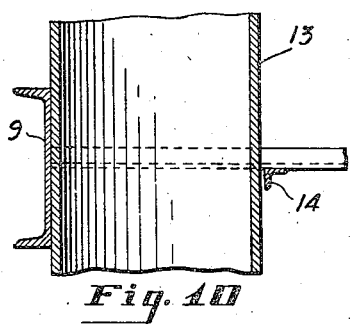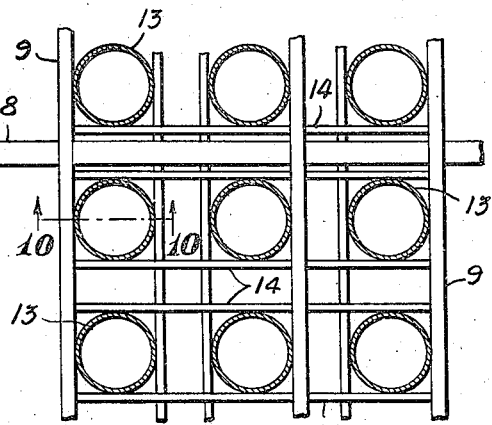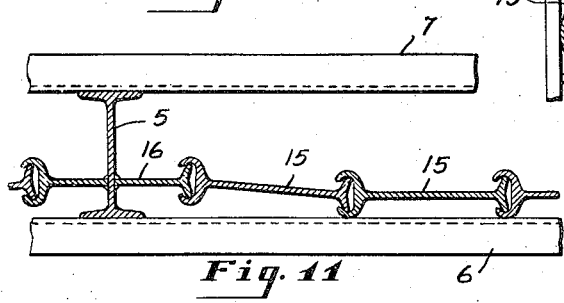

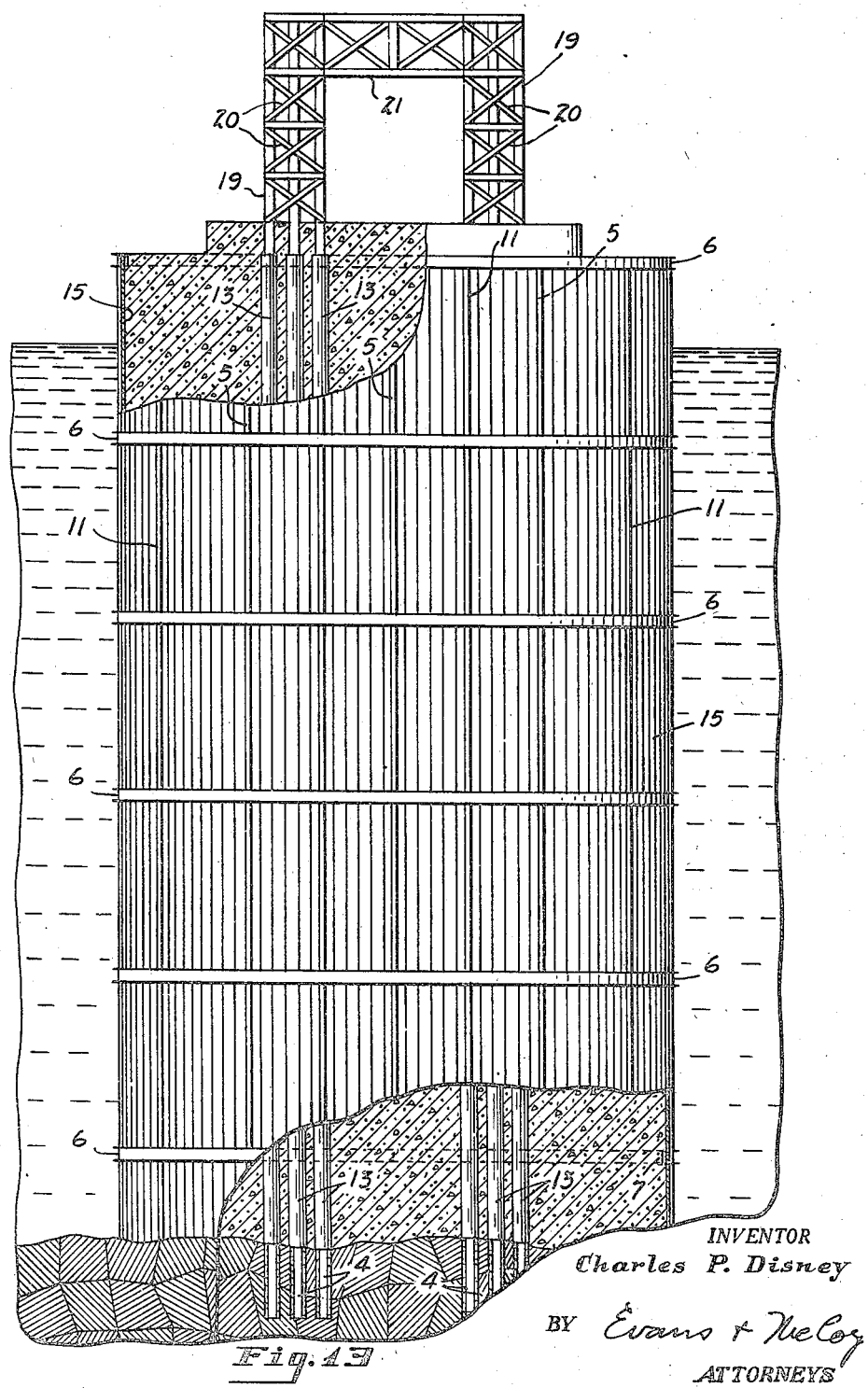

Patented Aug. 6, 1946

2,405,295

UNITED STATES PATENT OFFICE 2,405,295

METHOD OF CONSTRUCTING PIERS

Charles P. Disney, Toronto, Ontario, Canada

Original application October 20, 1944, Serial No. 559,607. Divided and this application November 5, 1945, Serial No. 626,761

5 Claims. (Cl. 61—52)

This invention relates to a method of building bridge piers, abutments, shipping docks and the like upon river or sea beds, and particularly to a method of building such structures upon beds of shale rock or other solid foundations, this application being a division of my copending application Serial No. 559,607, filed October 20, 1944.

The present invention has for its primary object to make it possible for men working above the water level to build abutments, piers, docks, etc., without the use of pneumatic caissons, cofferdams or the like in practically any depth of water that is likely to be encountered, thereby making it possible to eliminate extremely long steel spans such as have been constructed in many existing bridges, e. g. the Quebec, Firth of Forth and San Francisco bridges.

An additional object of the invention is to provide a new and improved method of penetrating into the rock foundation with steel or concrete piling.

With the above and other objects in view, the invention may be said to comprise the method and apparatus as illustrated in the accompanying drawings hereinafter described and particularly set forth in the appended claims, together with such variations and modifications thereof as will be apparent to those skilled in the art to which the invention pertains.

Reference should be had to the accompanying drawings forming a part of this specification, in which:

Figure 1 is a fragmentary side elevation showing a portion of the bridge having piers such as produced by the method of the present invention;

Fig. 2 is a horizontal section through the body portion of the pier, taken on the line indicated at 2—2 in Fig. 1;

Fig. 3 is a horizontal section through the top portion of the pier, taken on the line indicated at 3—3 in Fig. 1;

Fig. 5 is a top plan view of the form frame;

Fig. 6 is a section taken on the line indicated at 6—6 in Fig. 5;

Fig. 7 is a section taken on the line indicated at 7—7 in Fig. 5;

Fig. 8 is a section taken on the line indicated at 8—8 in Fig. 7;

Fig. 9 is an enlarged fragmentary view of the vertical tubes and their supports;

Fig. 10 is a section taken on the line indicated at 10—10 in Fig. 9;

Fig. 11 is a fragmentary, horizontal section through a portion of the completed form wall;

Fig. 13 is a side elevation of a completed pier with parts broken away to show the anchoring, reinforcing and supporting members.

In building a pier by the method of the present invention, a form comprising an enclosing wall of a size to enclose the entire pier from the foundation to above the water level is erected in the water and filled with concrete.

In constructing the wall form, a skeleton frame having suitable fixed supporting columns, guide members and adjustable columns around the periphery thereof is first lowered to the river or sea bed and properly centered and is then plumbed by means of the adjustable columns, after which the wall is completed by lowering wall forming members with the aid of the guide members into the spaces between the columns.

When the river or sea bed is solid rock or rock with a relatively thin overburden of sand, gravel or silt, the present invention provides a method of constructing a pier having load carrying columns of steel or reinforced concrete that extend through the body of concrete and into holes drilled into the bedrock. In such piers the superstructure is supported upon the steel or reinforced concrete columns and the body of concrete enclosing the columns protects them from the water and provides lateral support for the columns.

To facilitate the drilling of holes into the bed rock and the erection of the main supporting columns, suitably positioned upright tubes are so mounted within the skeleton frame that they extend from the bottom to above the water level. After erection of the form and the placement of concrete within the form, holes of the required depth are formed in the bed rock by means of drills lowered through the tubes and the supporting columns are erected within the upright tubes.

In the accompanying drawings a reinforced concrete steel pile pier is shown which comprises the concrete enclosing body 1 that extends from the river or sea bed to above the water line and a projecting pillar portion which may be enclosed in concrete as indicated at 2 in Fig. 1 or which may be formed of structural steel as indicated at 2ª in Fig. 1. Bridge sections 3 may be supported upon the pillar portions 2 which are formed by the upper ends of the supporting columns 4 which as herein shown are steel H piles anchored in the bed rock, extending to the top of the pillar portion and forming the main load supporting elements of the pier, the body 1 of concrete serving to protect the steel from the action of the water and to provide lateral support for the load carrying columns.

Figure 4:
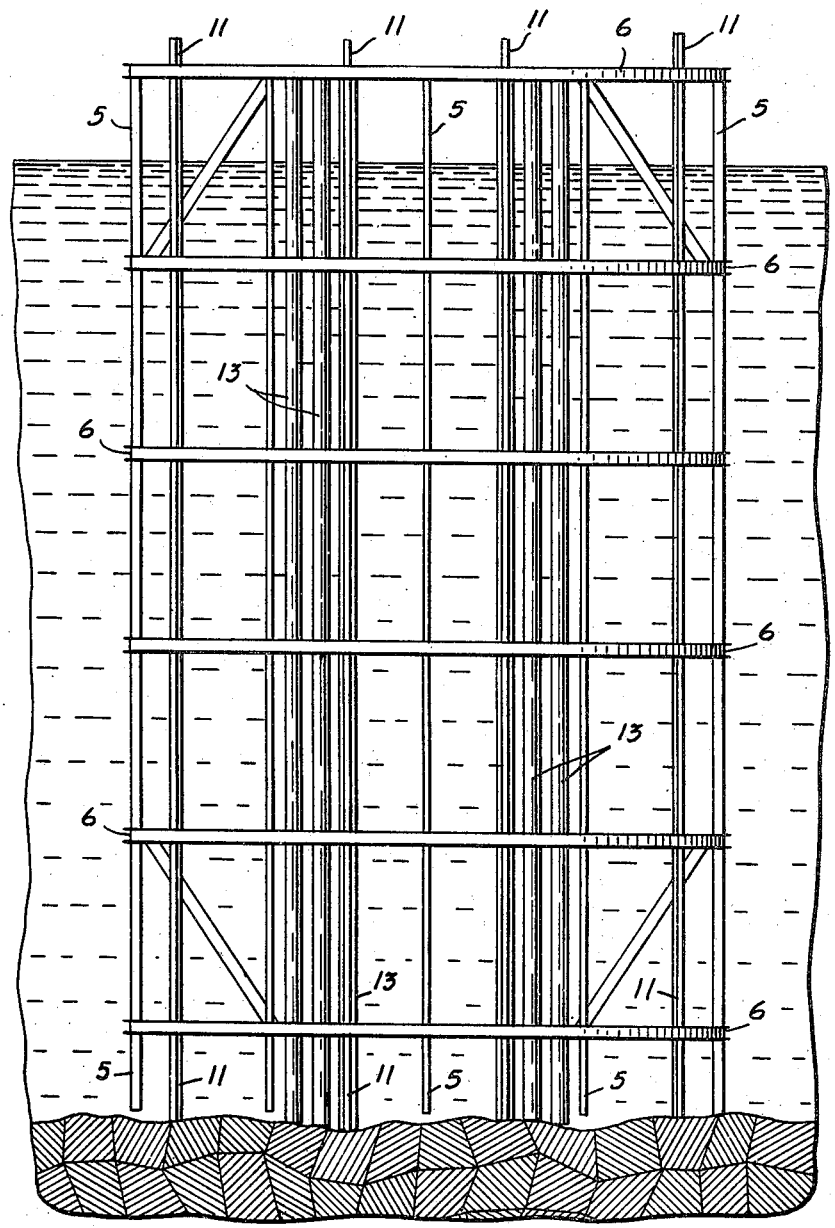
Fig. 4 is a side elevation of the skeleton form frame, resting upon the bottom and projecting above the surface of a body of water.
Figure 12:
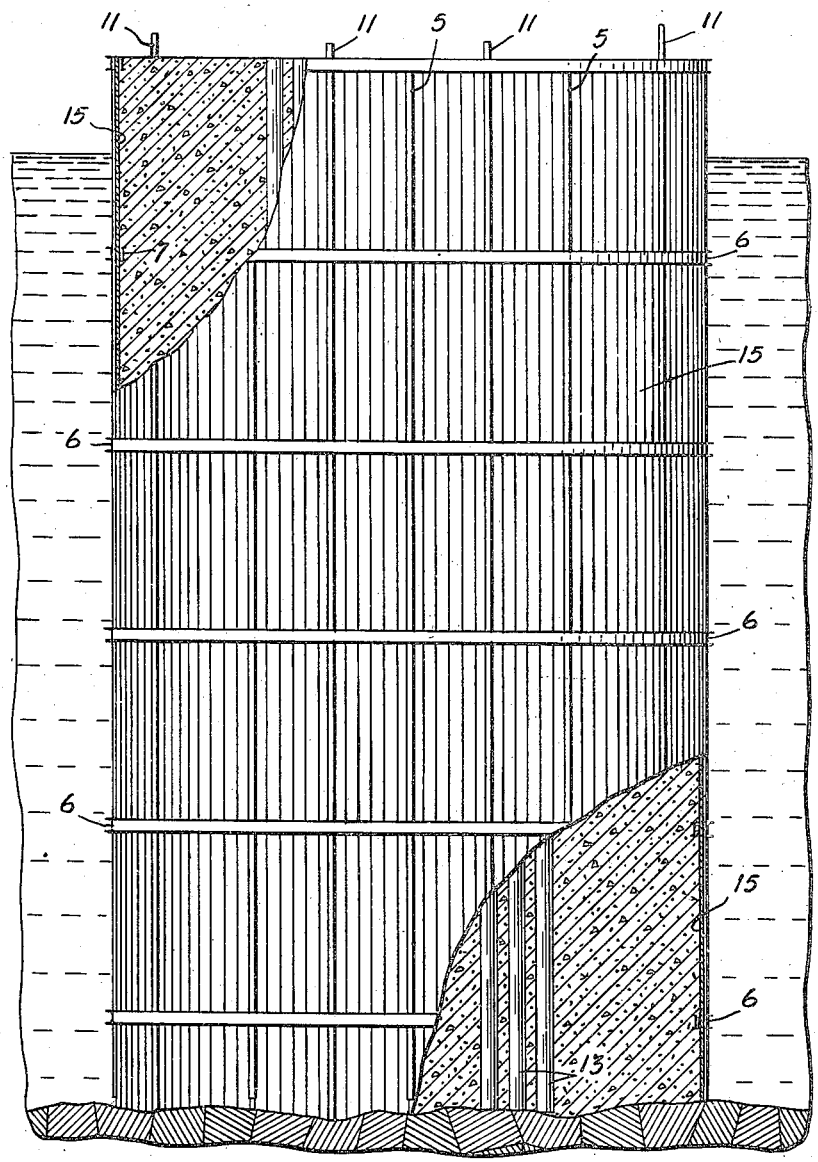
Fig. 12 is a side elevation of the completed form with portions broken away to show the body of concrete within the form, and the tubes within the body of concrete.

The skeleton frame and the enclosing wall inside which the concrete is placed is illustrated in detail in Figs. 4 to 11.

The skeleton frame is provided with vertical columns 5 which are preferably in the form of rolled I-beams and which are spaced about the periphery of the frame. The columns 5 are connected by outer horizontal frame bars 6 which as herein shown are in the form of rolled channel bars, disposed end to end to form bands about the exterior of columns 5 and secured to the outer faces of the columns 5. The bands formed by the outer frame bars 6 are spaced apart throughout the height of the frame, and inner horizontal frame bars 7 attached to the inner faces of the columns 5 form bands spaced inwardly from the bands formed by the frame bars 6. The I-beam columns 5 are preferably arranged with their webs at right angles to the outer and inner bars 6 and 7 so that the opposite faces of the I-beams engage the inner faces of the outer bars and the outer faces of the inner bars, the bars 6 and 7 being fixed to columns 5 by welding, riveting or other suitable means. The frame structure which as herein shown has the form of an elongated oval in cross section may be stiffened by means of cross beams 8 (Fig. 5) which are disposed longitudinally of the oval and centrally of the frame in vertically spaced relation. The frame may be additionally strengthened by laterally spaced transverse cross beams 9 which connect opposite sides of the frame at spaced points throughout the height thereof. As shown in Fig. 6 the cross beams 9 may be welded in the channels of the inner frame bars 7.

Between certain of the vertical columns 5, adjustable columns 11 may be mounted. The columns 11 are guided for vertical sliding movements between the outer and inner frame members 6 and 7. The columns 11 may be in the form of I-beams like the columns 5 and are guided between angle guide members 12 attached to the opposed faces of the frame bars 6 and 7. While the frame is being lowered to the bottom, the adjustable columns 11 may be attached by bolts or other suitable means to frame members 6 and 7 adjacent the top of the frame. When the body of the frame rests upon the river or sea bed, the frame is shifted about until it is properly centered and it is then leveled or plumbed by releasing and adjusting one or more of the vertically adjustable columns 11. A low portion of the frame may be lifted by suitable means to adjust the frame vertically on one or more of the slidable columns 11 and bring the frame to plumb, after which the top of the frame is firmly attached to the adjusted columns 11 by welding, riveting or other suitable means.

When a pier is to be built upon a rock bottom, a series of adjustable vertical tubes 13 of large diameter are mounted between the cross beams 9. The adjustable tubes 13 extend substantially the height of the frame and may be held in place in the frame by temporary welds or bolts to the beams 9 or by other suitable means. After the frame has been centered and plumbed the tubes 13 may be freed from the beams 9 and allowed to drop into engagement with the bed rock, the downward movement of the tubes being guided by the beams 9 and cross bars 14 as shown in Figs. 9 and 10.

After the steel skeleton frame has been lowered into engagement with the river or sea bed and properly positioned as above described, the enclosing wall of the form is completed by lowering suitable adjustable wall forming members, preferably steel sheet piling, into the spaces between the vertical columns 5 and 11. The outer and inner frame bars 6 and 7 provide guiding and positioning members for wall sections that are lowered into place between the columns. The wall sections may be in the form of steel plates, but as shown in Fig. 11, are preferably in the form of interlocking steel piling 15 which can be lowered into place in the spaces between the columns to close the spaces and complete the form wall. In order to join the piling 15 to the columns 5 and 11, the columns preferably have piling sections 16 secured to the webs thereof in any suitable manner such as by welding as shown in Fig. 11.

After the steel skeleton frame, with enclosing wall, is finally lowered and adjusted into its final level and position onto the rock foundations and filled with concrete, the holes formed in this concrete by the tubes 13 around which the concrete was cast, are used to permit of the entrance of rock drills to drill holes in the rock foundations to permit of the entry of the main steel or reinforced concrete supporting columns and to anchor these columns into the rock and to anchor the whole monolithic pier structure to the rock bottom of the watercourse.

Before commencing concreting inside the steel skeleton frame, the lower ends of the adjustable tubes 13 may temporarily be plugged with concrete or other suitable material to prevent entry of concrete into the tubes, and after the form has been filled with concrete suitable drills may be lowered to the bottom of the tubes 13 and operated to drill a hole to the desired depth in the bed rock. If reinforced concrete columns are used the reinforcement is placed in the tubes 13 and the tubes are filled with concrete placed under pressure.

When the upper ends of the steel piles 4 are not enclosed in concrete the piles 4 in each group are preferably connected by a suitable lattice work of horizontal and diagonal bars 18 and 19 as shown in Figs. 1 and 13, and the spaced groups of the piles may be connected at their upper ends by a truss structure 20 as shown in Fig. 13.

By means of the method above described, piers of ample strength may be erected in very deep water at a comparatively low cost, and bridges of simple and inexpensive construction with relatively short spans may be built over wide expanses of deep water instead of long span bridges.

It is to be understood that variations and modifications of the specific process and product herein shown and described for purposes of illustration may be made without departing from the spirit of the invention.

What I claim is:

1. The method of constructing a pier which comprises building a pier form comprising an enclosing wall extending from the bottom to above the top of a body of water, forming a body of concrete within the form that fills the form from the bottom to above the water level and that has spaced openings from top to bottom, drilling holes into the bedrock beneath said openings, positioning steel reinforcing members in said drilled holes that extend up into said openings, and filling the holes and openings containing said members with concrete.

2. The method of constructing a pier which comprises building a pier form comprising an enclosing wall extending from the bottom to above the top of a body of water, forming a body of concrete within the form that fills the form from the bottom to above the water level and that has spaced openings from top to bottom, drilling holes into the bedrock beneath said openings, positioning steel piles in said drilled holes that extend upwardly through the openings and project above the top of the body of concrete, and filling said holes and openings around said piles with concrete.

3. The method of constructing a pier which comprises building a pier form comprising an enclosing wall extending from the bottom to above the top of a body of water and having a series of vertical tubes spaced inwardly from said wall and from one another and extending substantially from the top to the bottom of the form, filling the space outside the tubes and within the wall with concrete, drilling holes into bedrock beneath the lower ends of the tubes, positioning steel piles in said tubes with their lower ends in said holes, and filling said tubes and holes around said piles with concrete.

4. The method of constructing a pier which comprises building a pier form comprising an enclosing wall extending from the bottom to above the top of a body of water and having a series of vertical tubes spaced inwardly from said wall and from one another and extending substantially from the top to the bottom of the form, filling the space outside the tubes and within the wall with concrete, drilling holes into bedrock beneath the lower ends of the tubes, positioning an H pile centrally of each tube with its lower end in a drilled hole and its upper end above the top of the form, and filling the tubes and holes around said piles with concrete.

5. The method of building a pier which comprises forming a block of concrete resting upon the bottom and extending above the top of a body of water and having holes extending therethrough from top to bottom, drilling holes into the bedrock beneath the block of concrete in alinement with said holes, positioning steel reinforcing members in said holes with their lower ends extending into the bedrock and filling said holes with concrete to embed said reinforcing members.

CHARLES P. DISNEY.